US012132279B2

(12) United States Patent
Yoshino

(10) Patent No.: US 12,132,279 B2
(45) Date of Patent: Oct. 29, 2024

(54) CONNECTOR WITH A CONNECTION POSITION ASSURANCE DEVICE

(71) Applicant: Tyco Electronics Japan G.K., Kawasaki (JP)

(72) Inventor: Hiromichi Yoshino, Kawasaki (JP)

(73) Assignee: Tyco Electronics Japan G.K., Kawasaki (JP)

( * ) Notice: Subject to any disclaimer, the term of this patent is extended or adjusted under 35 U.S.C. 154(b) by 363 days.

(21) Appl. No.: 17/732,674

(22) Filed: Apr. 29, 2022

(65) Prior Publication Data

US 2022/0255265 A1 Aug. 11, 2022

Related U.S. Application Data

(63) Continuation of application No. PCT/JP2020/038744, filed on Oct. 14, 2020.

(30) Foreign Application Priority Data

Oct. 29, 2019 (JP) ................................ 2019-196577

(51) Int. Cl.
*H01R 13/641* (2006.01)
*H01R 13/00* (2006.01)
*H01R 13/52* (2006.01)

(52) U.S. Cl.
CPC ....... *H01R 13/641* (2013.01); *H01R 13/5205* (2013.01)

(58) Field of Classification Search
CPC ........... H01R 13/5205; H01R 13/6272; H01R 13/641; H01R 24/86
See application file for complete search history.

(56) References Cited

U.S. PATENT DOCUMENTS 4,993,967 A 2/1991 Matsumoto
6,077,101 A 6/2000 Garretson et al.
6,491,542 B1 * 12/2002 Zerebilov ........... H01R 13/639 439/352

(Continued)

FOREIGN PATENT DOCUMENTS

EP 3139451 A1 8/2016
JP 337977 A 2/1991

(Continued)

OTHER PUBLICATIONS

Japanese International Search Report and English Translation, Application No. PCT/JP2020/038744, Dated: Dec. 15, 2020, 8 pages.

(Continued)

*Primary Examiner* — Hae Moon Hyeon
*Assistant Examiner* — Thang H Nguyen
(74) *Attorney, Agent, or Firm* — Barley Snyder

(57) ABSTRACT

A connector includes a housing having a mating portion matable with a mating connector and a flexible beam with a housing-side catch portion, and a connection position assurance device (CPA) that slides between a first position on the housing and a second position closer to the mating portion than the first position. The CPA in the second position assures that the connector is completely mated with the mating connector. The flexible beam extends in a sliding direction of the CPA and slidably supports the CPA. The housing-side catch portion interferes with the CPA and deflects by interfering with the CPA. The CPA includes a rail that has a device-side catch portion interfering with the housing-side catch portion and that slides while being supported by the flexible beam.

19 Claims, 11 Drawing Sheets

(56) References Cited

U.S. PATENT DOCUMENTS

| | | | | |
|---|---|---|---|---|
| 6,896,538 | B2 * | 5/2005 | Grubbs | H01R 13/6272 439/352 |
| 8,827,729 | B2 * | 9/2014 | Gunreben | H01R 13/70 439/188 |
| 11,245,228 | B2 * | 2/2022 | Takeuchi | H01R 13/506 |
| 2003/0157825 | A1 * | 8/2003 | Kane | H01R 13/641 439/352 |
| 2003/0171027 | A1 * | 9/2003 | Shuey | H01R 13/6272 439/489 |
| 2004/0087206 | A1 * | 5/2004 | Grubbs | H01R 13/639 439/489 |
| 2010/0233397 | A1 | 9/2010 | Al-Mutawa | |
| 2010/0233897 | A1 * | 9/2010 | Seo | H01R 13/6272 439/345 |
| 2013/0330959 | A1 * | 12/2013 | Bashkin | H01R 13/62955 439/372 |
| 2014/0302702 | A1 * | 10/2014 | Germ | H01R 13/639 439/370 |
| 2018/0226748 | A1 * | 8/2018 | Hayasaka | H01R 13/6272 |
| 2020/0153149 | A1 * | 5/2020 | Tanaka | H01R 13/6272 |

FOREIGN PATENT DOCUMENTS

| | | | | |
|---|---|---|---|---|
| JP | H03285280 A | | 12/1991 | |
| JP | 2006505113 T | | 2/2006 | |
| JP | 201750232 A | | 3/2017 | |
| WO | WO-2017158566 A1 | * | 9/2017 | H01R 13/6272 |
| WO | 2019082754 A1 | | 5/2019 | |

OTHER PUBLICATIONS

Extended European Search Report dated Nov. 3, 2023, corresponding to Application No. 20883211.3-1201, 8 pages.

* cited by examiner

CONNECTOR WITH A CONNECTION POSITION ASSURANCE DEVICE

CROSS-REFERENCE TO RELATED APPLICATIONS

This application is a continuation of PCT International Application No. PCT/JP2020/038744, filed on Oct. 14, 2020, which claims priority under 35 U.S.C. § 119 to Japanese Patent Application No. 2019-196577, filed on Oct. 29, 2019.

FIELD OF THE INVENTION

The present invention relates to a connector including a connector position assurance device (CPA, Connector Position Assurance) that assures that the connector is in a state of being completely mated with a mating connector.

BACKGROUND

As disclosed in Japanese Patent Application JP2006-505113T, for example, a connector including the aforementioned CPA is known. The CPA of JP2006-505113T is a member that slides in a direction of mating with a mating connector on a sliding surface formed on a connector housing. Moreover, the CPA can slide into a particular position only in a state in which the connector is completely mated with the mating connector. Thus, it is assured by the CPA being in a state of having slid into the particular position that the connector is completely mated with the mating connector.

However, in the case of a waterproof connector having a waterproof seal member, the housing is required to have a portion that supports the seal member, and the portion causes the housing to be large in size. Let it be assumed, for example, that a CPA is mounted on such a large-sized housing. Doing so makes it necessary to provide a sliding surface in a high position so that a mold for forming the sliding surface can slide around the large-sized portion of the housing, undesirably causing the housing to be even larger in size (higher in height).

SUMMARY

A connector includes a housing having a mating portion matable with a mating connector and a flexible beam with a housing-side catch portion, and a connection position assurance device (CPA) that slides between a first position on the housing and a second position closer to the mating portion than the first position. The CPA in the second position assures that the connector is completely mated with the mating connector. The flexible beam extends in a sliding direction of the CPA and slidably supports the CPA. The housing-side catch portion interferes with the CPA and deflects by interfering with the CPA. The CPA includes a rail that has a device-side catch portion interfering with the housing-side catch portion and that slides while being supported by the flexible beam.

BRIEF DESCRIPTION OF THE DRAWINGS

The invention will now be described by way of example with reference to the accompanying Figures, of which.

DETAILED DESCRIPTION OF THE EMBODIMENT(S)

The following describes an embodiment of the present invention.

Figure 1A:
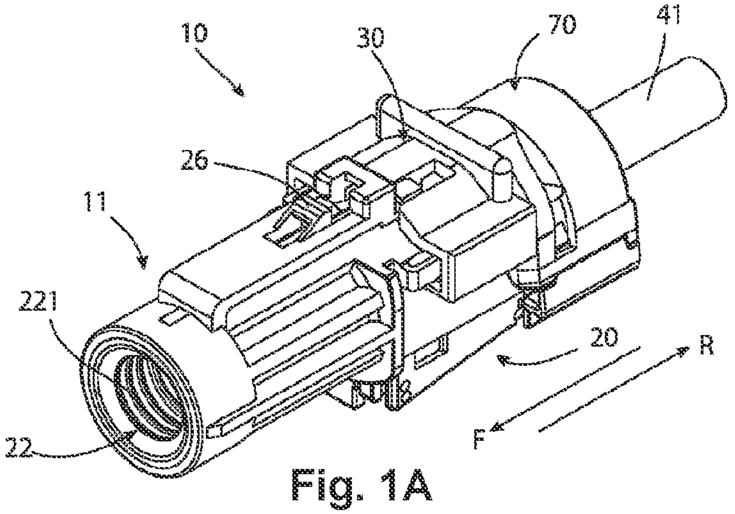
FIG. 1A is an isometric view of a connector according to an embodiment of the present invention.
Figure 1B:
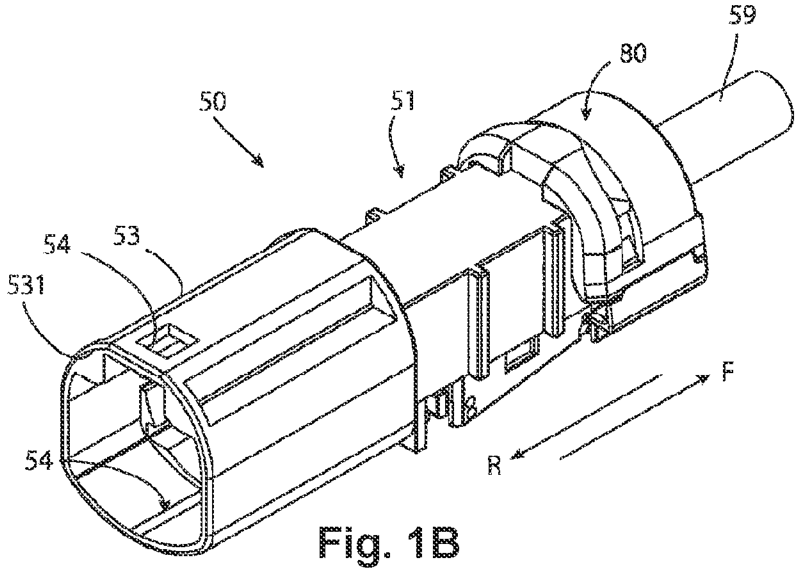
FIG. 1B is an isometric view of a mating connector that is mated with the connector.
Figure 2A:
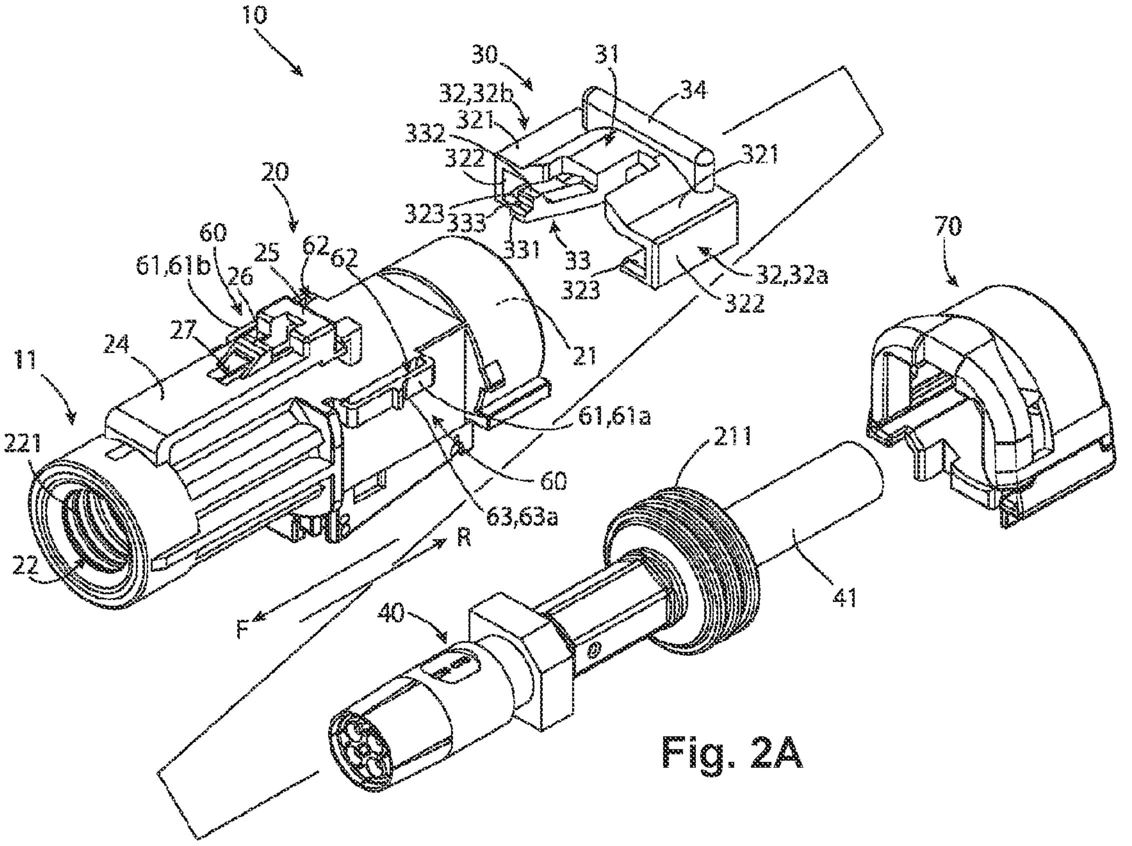
FIG. 2A is an exploded isometric view of the connector of FIG. 1A.
Figure 2B:
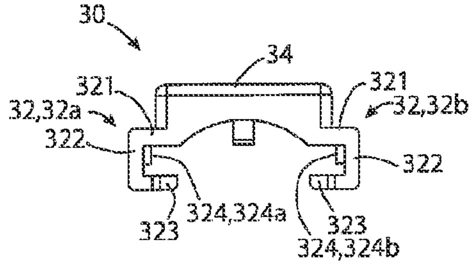
FIG. 2B is a rear view of a connector position assurance device (CPA)
Figure 3:
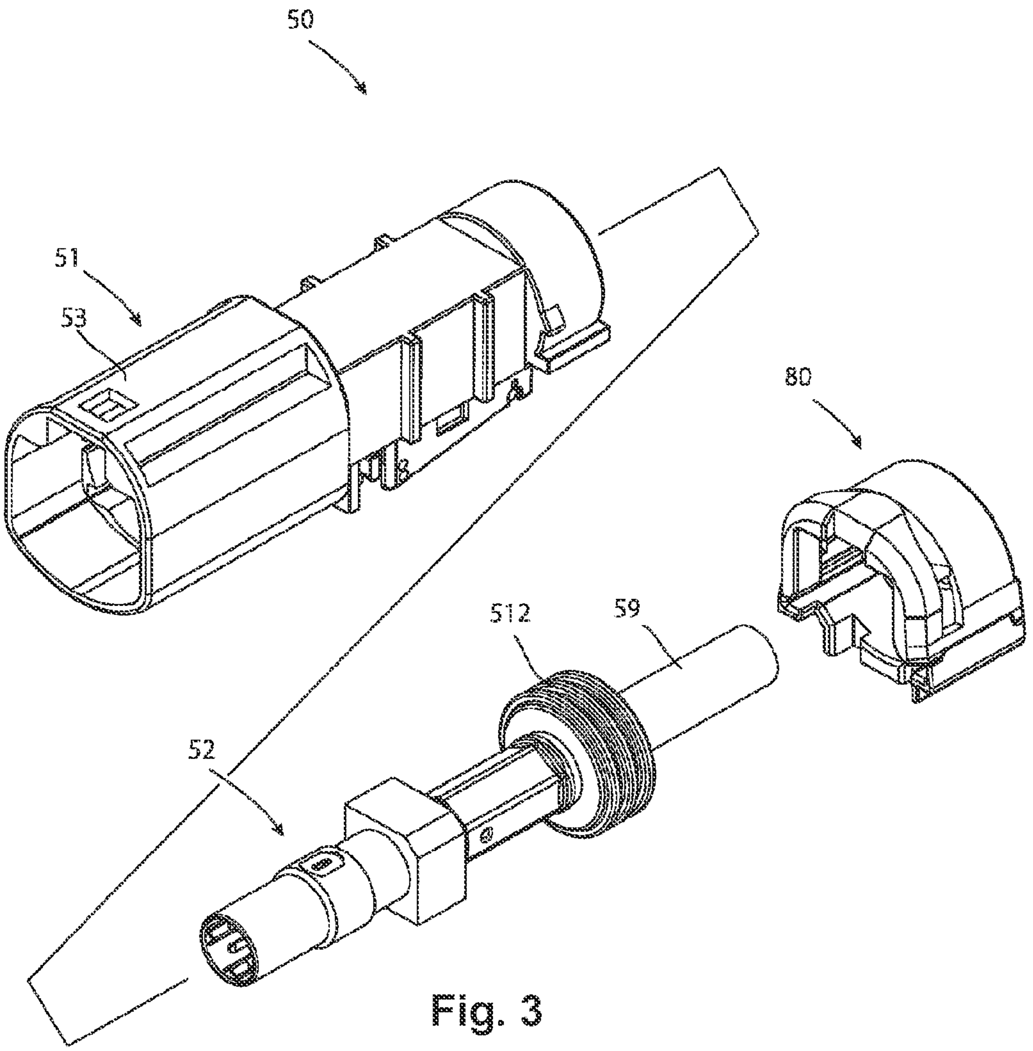
FIG. 3 is an exploded isometric view of the mating connector.

FIG. 1A is an isometric view of a connector according to an embodiment of the present invention, and FIG. 1B is an isometric view of a mating connector that is mated with the connector. FIG. 2A is an exploded isometric view of the connector of FIG. 1A and FIG. 2B is a rear view of a connector position assurance device (CPA). FIG. 3 is an exploded isometric view of the mating connector.

A connector 10 includes a housing 20, a CPA 30, a terminal module 40, a seal member 211, and a seal holder 70, as shown in FIGS. 1A and 2A. The seal member 211 is positioned in advance on a cable 41 prior to assembly of the terminal module 40. The terminal module 40 includes a contact, and the cable 41 is connected to the contact. Moreover, the terminal module 40 is plugged into the housing 20 in the direction of the arrow F from an opening 21 (see FIG. 2A) at a rear end portion of the housing 20. The seal member 211 is set to fit into the opening 21. After that, by attaching the seal holder 70, the seal member 211 is fixed so as not to fall off rearward. The cable 41 extends rearward (in the direction of the arrow R) from the opening 21 and is exposed from the housing 20. The seal member 211 makes the junction between the housing 20 and the cable 41 waterproof by surrounding the cable 41 connected to the terminal module 40. Positioning of the seal member 211 causes the housing 20 to be shaped such that a rear end portion 23 of the housing 20 greatly bulges. Further, the CPA 30 is positioned above the housing 20. The CPA 30 will be described later.

The connector 10 has a mating portion 11 on a front end side in the direction of the arrow F, as shown in FIGS. 1A and 2A. Moreover, the connector 10 has at a front end thereof a mating opening 22 into which a terminal module 52, shown in FIG. 3, which is a mating portion of a mating connector 50, is plugged when the connector 10 is mated with the mating connector 50. Further, inside the mating opening 22, a seal member 221 is provided that makes contact with an outer surface of the terminal module 52 of the mating connector 50 to make that portion waterproof. Upon mating of the mating connector 50, a contact of the terminal module 52 of the mating connector 50 makes electrical contact with the contact of the terminal module 40 of the connector 10.

A mating connector 50 shown in FIGS. 1B and 3 includes a housing 51, a terminal module 52, a seal member 512, and a seal holder 80. The housing 51 is provided with a hood portion 53 having an opening at a front end in the direction of the arrow R. Further, the terminal module 52 has a contact, and a cable 59 is connected to the contact. The seam member 512 is positioned in advance on the cable 59 prior to assembly of the terminal module 52. The terminal module 52 is plugged from an opening 511 at a rear end indicated by the arrow F into the housing 51 to such a position as to protrude into the hood portion 53. The seal member 512 is set so as to fit into the opening 511. After that, the seal member 512 is fixed by attaching the seal holder 80 to the housing 51. The cable 59 extends in the direction of the arrow F from the opening 511 at the rear end of the CPA and is exposed from the housing 51. The seal member 512 makes the junction between the housing 51 and the cable 59 waterproof by surrounding the cable 59 connected to the terminal module 52.

In mating, the mating portion 11 of the connector 10 of FIG. 1A is plugged into the hood portion 53 of the mating connector 50. Note here that the hood portion 53 has a lock hole 54, shown in FIG. 1B, formed in a position slightly further rearward than a leading end 531 of the hood portion 53. Further, the connector 10 is provided with a lock portion 26. Moreover, the mating portion 11 is plugged into the hood portion 53, and the lock portion 26 is fitted into the lock hole 54, whereby the connectors 10 and 50 are brought into a completely mated state. The process of mating will be described later.

In an intermediate portion of the housing 20 in the front-rear directions indicated by the arrows F and R, a CPA retaining portion 60, shown in FIG. 2A, that retains the CPA 30 is provided. In order to be able to retain the CPA 30, the CPA retaining portion 60 includes flexible beams 61 at both ends thereof in a width direction. A space 62 is provided between each of these flexible beams 61 and the housing body, and this flexible beam 61 extends in the directions of the arrows F and R in which the CPA 30 slides, and has the shape of a double-supported beam whose front and rear ends are connected to the housing body. Moreover, this flexible beam 61 interferes with the CPA 30 as will be mentioned later, and elastically deflects in such a direction as to shrink the space 62 between the flexible beam 61 and the housing body. This flexible beam 61 is provided with a housing-side catch portion 63 protruding outward.

Figure 4O:
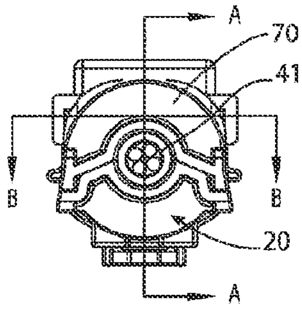
FIG. 4O is a rear view of the connector and the mating connector in a mating start attitude.
Figure 4A:
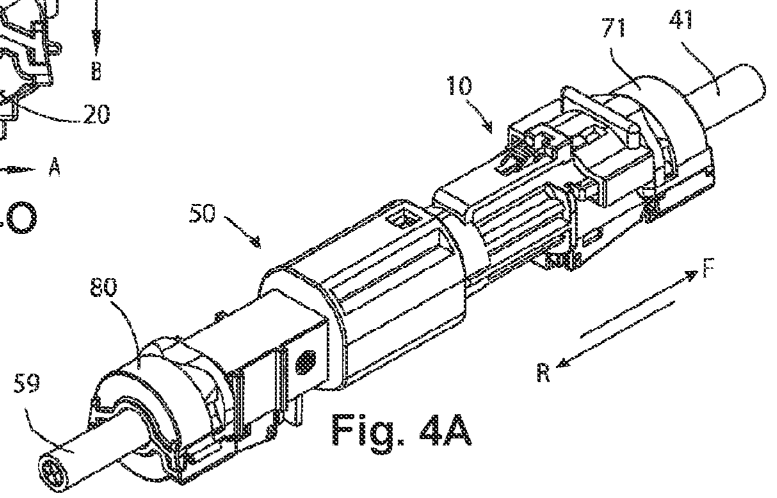
FIG. 4A is an isometric view of the connector and the mating connector in a mating start attitude.
Figure 4B:
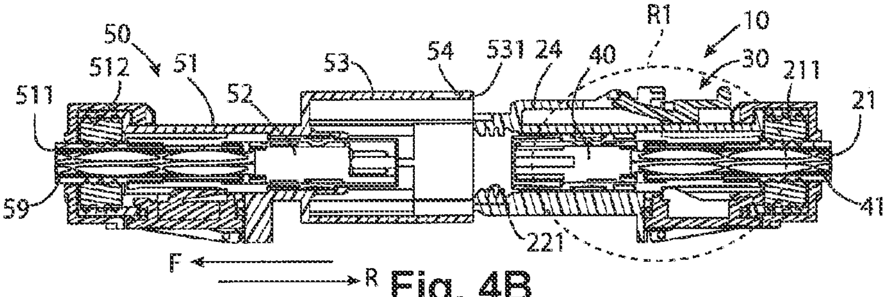
FIG. 4B is a sectional side view of the connector and the mating connector in the mating start attitude.
Figure 4C:
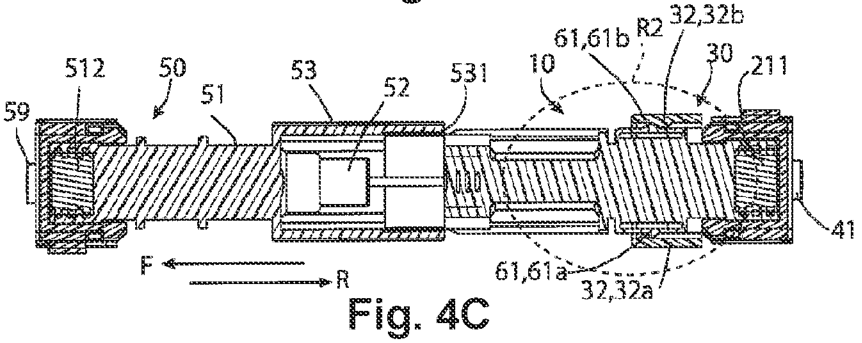
FIG. 4C is another sectional side view of the connector and the mating connector in the mating start attitude.
Figure 5B:
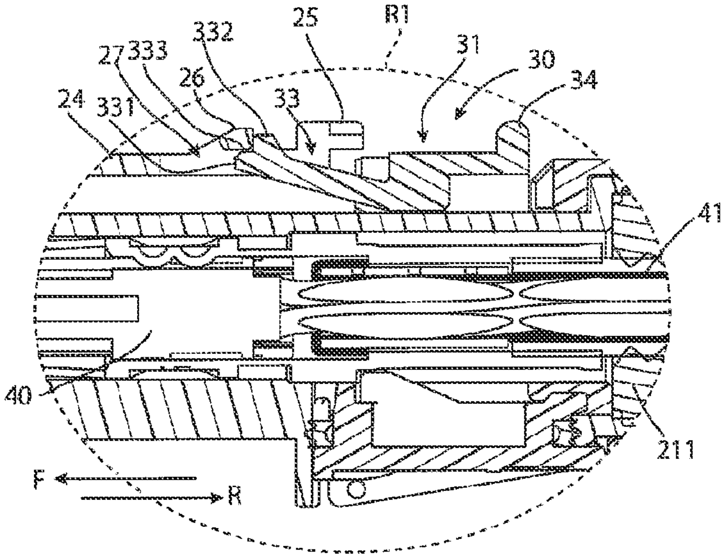
FIG. 5B is a detail view of a portion R1 of FIG. 4B.
Figure 5C:
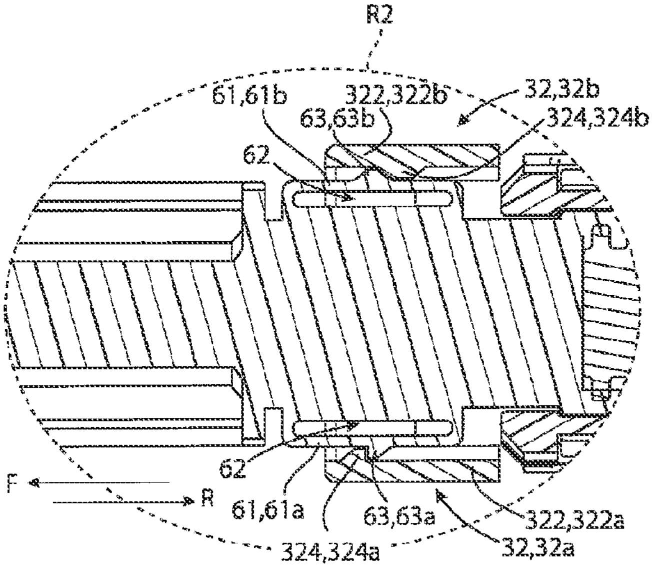
FIG. 5C is a detail view of a portion R2 of FIG. 4C.

FIG. 4C and FIG. 5C, which is a partially-enlarged view of FIG. 4C, show flexible beams 61*a* and 61*b* on both sides in the width direction. As shown in FIGS. 4C and 5C, the flexible beams 61*a* and 61*b* are provided with housing-side catch portions 63*a* and 63*b* formed in positions and shapes different from each other.

The CPA 30 has a basal portion 31 on the right and left sides of which rails 32 are formed, as shown in FIGS. 2A and 2B. Each of these rails 32 has an upper wall 321, a side wall 322 hanging down downward from a leading end of the upper wall 321, and a lower wall 323 spreading from a lower end of the side wall 322 in such a direction as to face the upper wall 322, and this rail 32 is supported by a flexible beam 61 of the housing 20 slidably in the directions of the arrows F and R such that the flexible beam 61 is interposed between the upper wall 321 and the lower wall 323.

Further, the side wall 322 of this rail 32 is provided with a device-side catch portion 324 protruding inward. The device-side catch portion 324 interferes with the housing-side catch portion 63 of the flexible beam 61 to cause the flexible beam 61 to warp or elastically deflect. FIGS. 4C and 5C show rails 32*a* and 32*b* on both sides in the width direction. As shown in FIGS. 4C and 5C, the rails 32*a* and 32*b* are provided with device-side catch portions 324*a* and 324*b* formed in positions and shapes different from each other Note here that in the case of a connector including a CPA, in general, a sliding surface on which the CPA is slidably mounted is provided as an upper surface of the housing 20. However, in the case of the connector 10 described here, as mentioned above, the seal member 211 is provided right inside the opening 21 in the rear end portion of the housing 20. For this reason, the housing 20 is shaped such that a portion covering the seal member 211 greatly bulges. The housing 20 is made from insulating resin, and is manufactured by molding. However, since the rear end portion of the housing 20 greatly bulges, the greatly-bulging rear end portion of the housing 20 becomes an obstacle to the formation of a sliding surface by a mold that moves rearward, making it necessary to form a sliding surface in such a high position as to circumvent the greatly-bulging rear end portion. Further, the after-mentioned lock arm 24 becomes an obstacle to the formation of a sliding surface by a mold that moves forward. To address this problem, the connector 10 according to the present embodiment is structured such that the housing 20 does not need to have a sliding surface. That is, the connector 10 according to the present embodiment is structured such that the housing 20 is provided with the flexible beams 61 and the CPA 30 is provided with the rails 32. By employing this structure, the connector 10 eliminates the need to provide the housing 20 with a slide surface for the CPA 30 and stops the housing 20 from becoming larger in size due to the inclusion of the CPA 30.

The CPA 30 has a beam portion 33 and a handling portion 34 in addition to the basal portion 31, which includes the right and left rails 32, as shown in FIGS. 2A and 2B.

The handling portion 34 is a portion that is handled by a user. Making a visual identification of the position of the handling portion 34 allows the handling portion 34 to serve as an indicator that indicates whether the CPA 30 is in a completely mated position. It is assured by the CPA 30 being in the completely mated position that the connector 10 and the mating connector 50 are in a completely mated state. FIGS. 10B and 10C show the CPA 30 in the completely mated position. Note, however, that FIG. 1A shows the CPA 30 in an unmated position that is further rearward in the direction of the arrow R than the completely mated position.

Further, the beam portion 33 of the CPA 30 extends in the shape of a cantilever forward as indicated by the arrow F and obliquely upward from the basal portion 31. A protrusion 332 protruding upward is formed in a position slightly closer to the basal portion 31 than a leading end 331 of the beam portion 33. Moreover, since the protrusion 332 is formed in a position slightly closer to the basal portion 31 than the leading end 331, the beam portion 33 has a step portion 333 formed between the leading end 331 and the protrusion 332.

The CPA 30 is plugged into the CPA retaining portion 60 from behind the housing 20 and retained in the CPA retaining portion 60. Once retained in the CPA retaining portion 60, the CPA 30 is placed in an unmated position shown in FIG. 1A. Moreover, at the time of mating with the mating connector 50, the CPA 30 slides into a completely mated position shown in FIGS. 10A-10C (see also FIGS. 11A-11C, are partially-enlarged views of FIGS. 10A-10C) in the direction of the arrow F as will be mentioned later. The unmated position is equivalent to an example of a first position as used in the present invention, and the completely mated position is equivalent to an example of a second position as used in the present invention.

The housing 20 has the lock arm 24, as shown in FIG. 2A, whose front end is fixed and that extends rearward in the shape of a cantilever beam. Moreover, at a rearward free end of the lock arm 24, a handling portion 25 that is handled in disengaging the connector 10 from the mating connector 50 is provided. Furthermore, a lock portion 26 is provided at a midpoint of the rearward extension of the lock arm 24. Moreover, furthermore, the lock arm 24 has a long hole 27 formed therein. The long hole 27 extends from a position further forward than the lock portion 26 to the rear freed end. Moreover, the handling portion 25 and the lock portion 26 are formed to bridge over the long hole 27 in the width direction.

FIGS. 4A-4C is show the connector 10 shown in FIG. 1A and the mating connector 50 shown in FIG. 1B in a mating start attitude. Note here that FIG. 40 is a rear view as seen the direction of the arrow F. Further, FIG. 4A is an isometric view. Furthermore, FIGS. 4B and 4C are cross sectional views taken along lines A-A and B-B shown in FIG. 4O, respectively. Further, FIG. 5B illustrates a partially-enlarged view of a region R1 shown in FIG. 4B, and FIG. 5C is a partially-enlarged view of a region R2 shown in FIG. 4C.

When the CPA 30 is in this unmated position, the protrusion 332 of the beam portion 33 of the CPA 30 is in contact with the lock portion 26 of the lock arm 24 of the housing 20. When the CPA 30 is in this unmated position, the engagement between the first device-side catch portion 324*a* and the first housing-side catch portion 63*a* prevents the CPA 30 from falling off in the direction of the arrow R.

Further, when the CPA 30 is in this unmated position, the CPA 30 is inhibited from sliding in the direction of the arrow F, as the protrusion 332 of the beam portion 33 is in contact with the lock portion 26 of the lock arm 24, as shown in FIG. 5B. Note, however, that the contact of the protrusion 332 with the lock portion 26 alone is not enough to inhibit the CPA 30 from sliding in the direction of the arrow F, as the beam portion 33 deforms when a strong force acts in the direction of the arrow F. To address this problem, the second device-side catch portion 324*b* is brought into contact with the second housing-side catch portion 63*b*, as shown in FIG. 5C, whereby the prevention of a slide of the CPA 30 in the direction of the arrow F is assisted. It should be noted that the contact between the second device-side catch portion 324*b* and the second housing-side catch portion 63*b* also plays a role of giving a sense of clicking when the CPA 30 slides in the direction of the arrow F into the completely mated position.

Figure 6A:
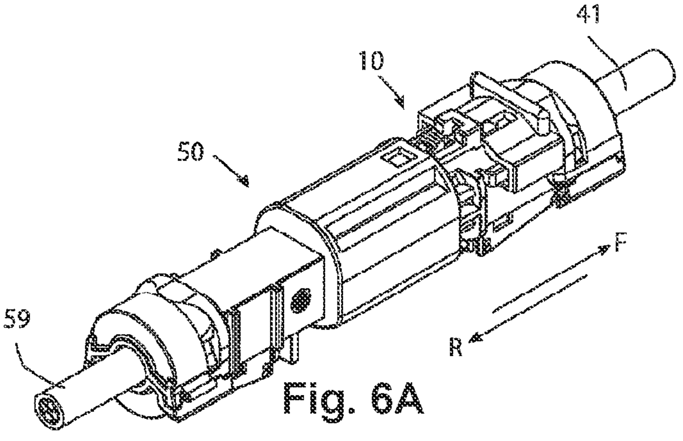
FIG. 6A is an isometric view of the connector and the mating connector in which the mating has proceeded from FIG. 4A.
Figure 6B:
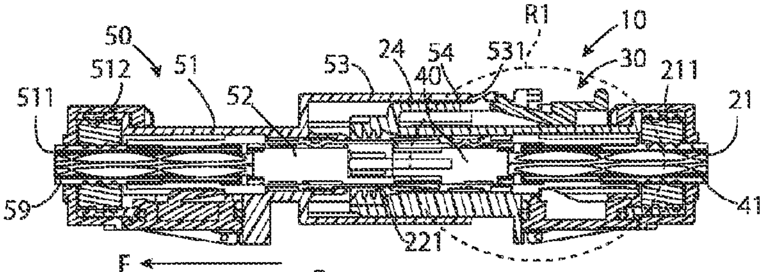
FIG. 6B is a sectional side view of the connector and the mating connector in FIG. 6A.
Figure 6C:
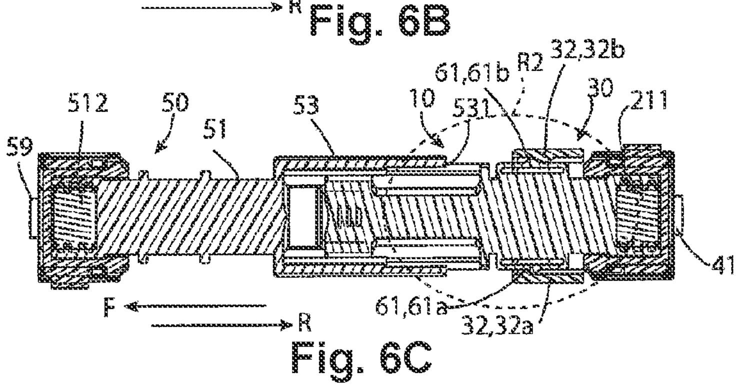
FIG. 6C is another sectional side view of the connector and the mating connector in FIG. 6A.
Figure 7B:
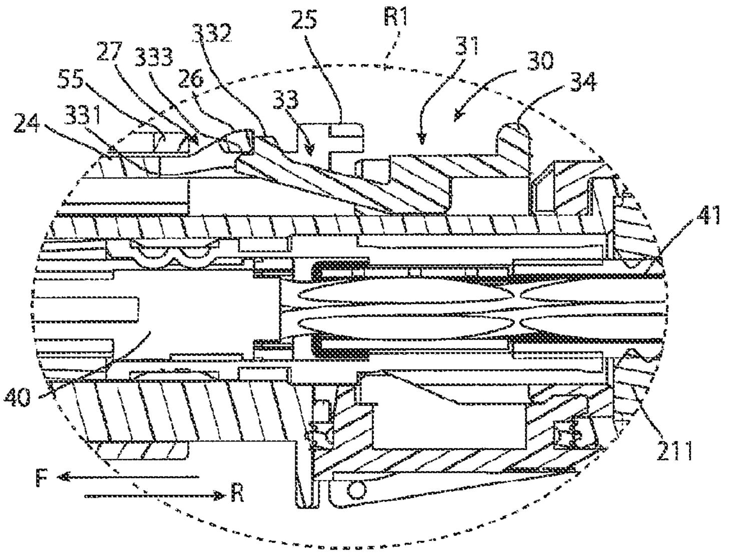
FIG. 7B is a detail view of a portion R1 of FIG. 6B.
Figure 7C:
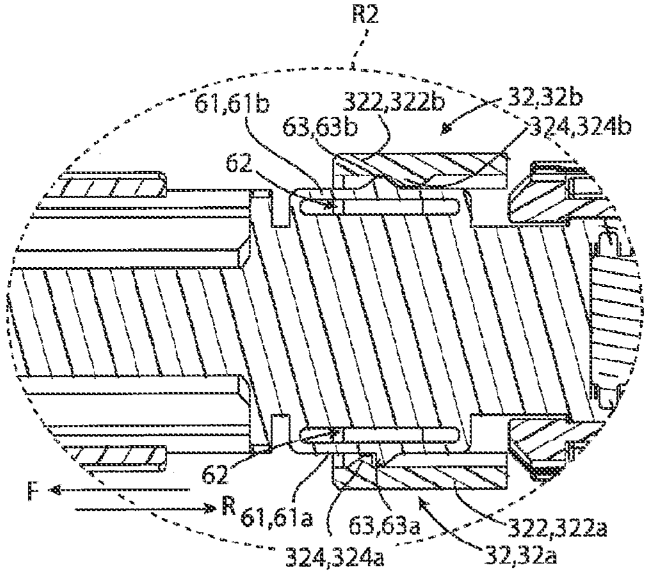
FIG. 7C is a detail view of a portion R2 of FIG. 6C.

FIG. 6A illustrates an isometric view similar to FIG. 4A in which the mating has proceeded a little further than in FIG. 4A and cross sectional views in FIGS. 6B and 6C. Further, FIG. 7B illustrates a partially-enlarged view of a region R1 shown in FIG. 6B and FIG. 7C illustrates a partially-enlarged view of a region R2 shown in FIG. 6C.

In FIGS. 6A-7C, the leading end 531 of the hood portion 53 of the mating connector 50 comes into contact with the lock arm 24, provided in the upper part of the housing 20 of the connector 10, which extends rearward. The lock hole 54 is formed in a position slightly further rearward in the direction of the arrow F than the leading end 531 of the hood portion 53. The CPA 30 in FIGS. 6A-7C is in the unmated position, and is in the same attitude as in FIGS. 4 and 5.

Figure 8A:
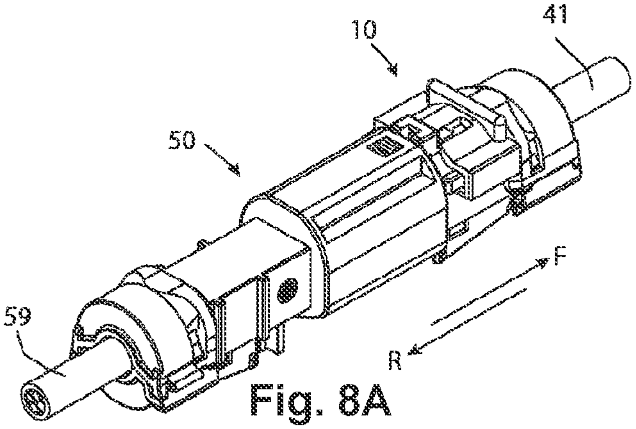
FIG. 8A is an isometric view of the connector and the mating connector in a completely mated state.
Figure 8B:
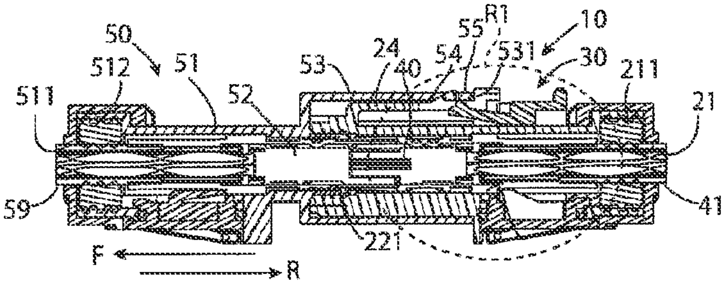
FIG. 8B is a sectional side view of the connector and the mating connector in FIG. 8A.
Figure 8C:
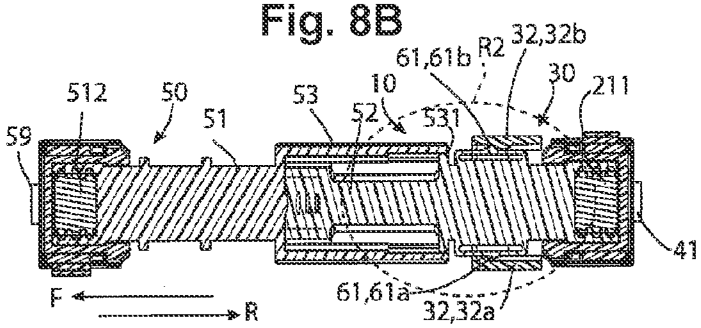
FIG. 8C is another sectional side view of the connector and the mating connector in FIG. 8A.
Figure 9B:
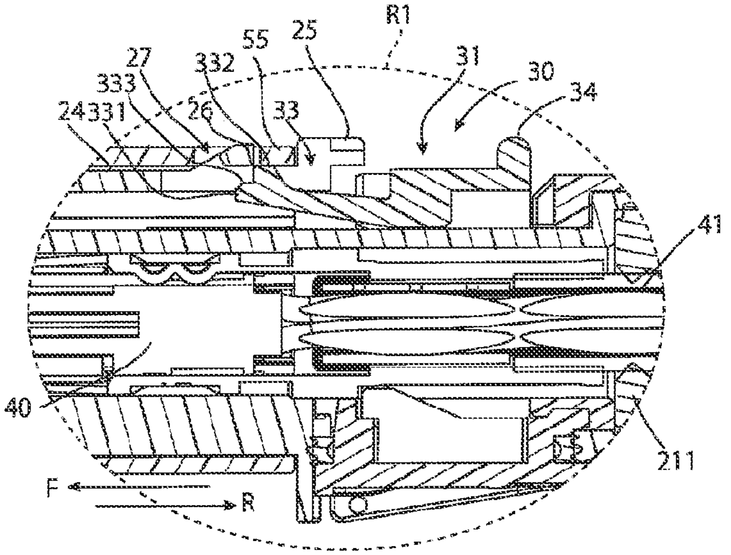
FIG. 9B is a detail view of a portion R1 of FIG. 8B.
Figure 9C:
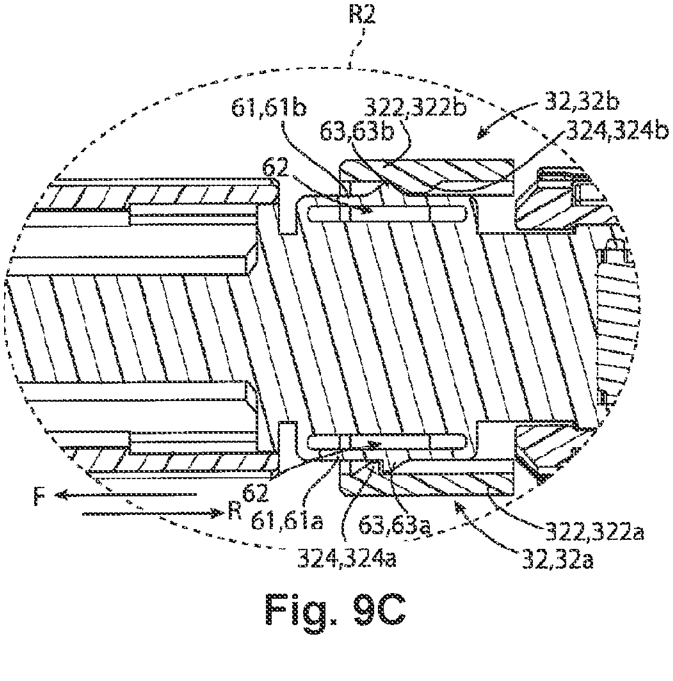
FIG. 9C is a detail view of a portion R2 of FIG. 8C.

FIG. 8A illustrates an isometric view similar to FIGS. 4A and 6A in which the mating has proceeded further than in FIG. 6A and the connector 10 of FIG. 1A and the mating connector 50 have been completely mated with each other, and cross sectional views in FIGS. 8B and 8C. Further, FIG. 9B illustrates a partially-enlarged view of a region R1 shown in FIG. 8B and FIG. 9C illustrates a partially-enlarged view of a region R2 shown in FIG. 8C.

As shown in FIG. 6B, the leading end 531 of the hood portion 53 of the mating connector 50 comes into contact with the lock arm 24, provided in the upper part of the housing 20 of the connector 10, which extends rearward. Then, when the mating further proceeds, the hood portion 53 presses down the lock arm 24 to cause the lock arm 24 to elastically deflect. Then, the lock portion 26 of the lock arm 24 presses down the step portion 333 at the leading end of the beam portion 33 of the CPA 30, whereby the beam portion 33 is elastically pressed down, too. Moreover, at a final stage of the mating, a separating portion 55 passes over the lock portion 26 thus pressed down. When the separating portion 55 passes over the lock portion 26, the lock portion 26 and the separating portion 55 swap their positions with each other in the front-rear directions indicated by the arrows F and R as shown in FIGS. 8B and 8C and FIGS. 9B and 9C. Although the connector 10 and the mating connector 50 are mated with each other at this stage, the CPA 30 is still in the unmated position. As noted above, the lock hole 54 is formed in a position slightly further rearward than the leading end 531 of the hood portion 53 of the mating connector 50. The leading end 531 of the hood portion 53 passes over the lock portion 26, and the lock hole 54 reaches directly above the lock portion 26. Then, the lock arm 24 becomes free from elastic deformation, so that the lock portion 26 fits into the lock hole 54. This causes the connector 10 and the mating connector 50 to be completely mated with each other, and the engagement between the lock portion 26 and the lock hole 54 causes the connector 10 and the mating connector 50 to be locked into a completely mated state.

Figure 10A:
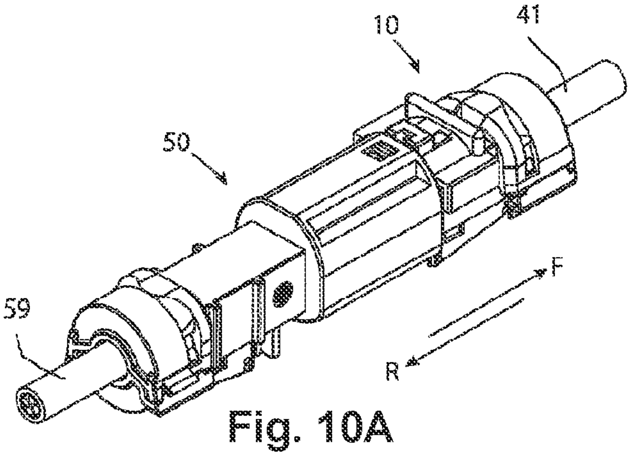
FIG. 10A is an isometric view of the connector and the mating connector in a completely caught position.
Figure 10B:
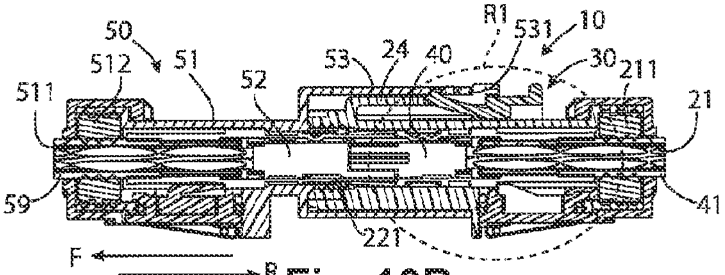
FIG. 10B is a sectional side view of the connector and the mating connector in FIG. 10A.
Figure 10C:
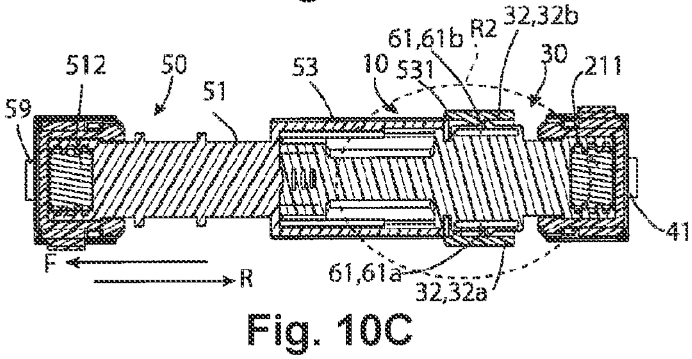
FIG. 10C is another sectional side view of the connector and the mating connector in FIG. 10A.
Figure 11B:
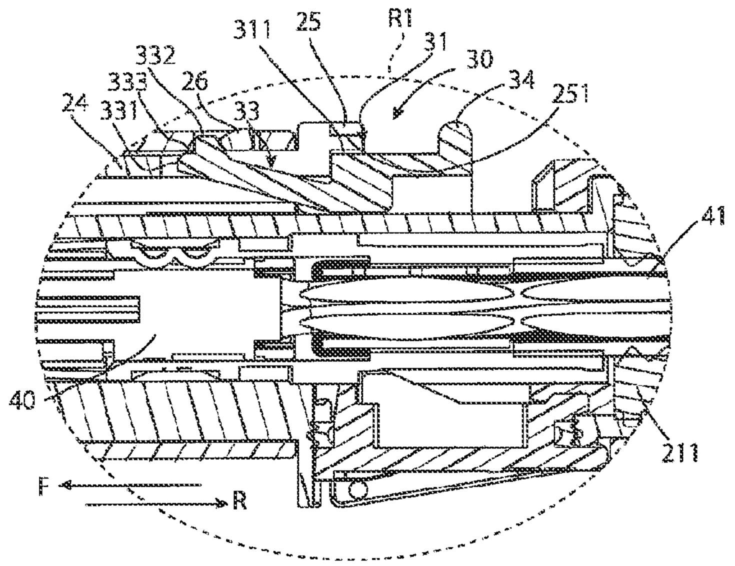
FIG. 11B is a detail view of a portion R1 of FIG. 11B.
Figure 11C:
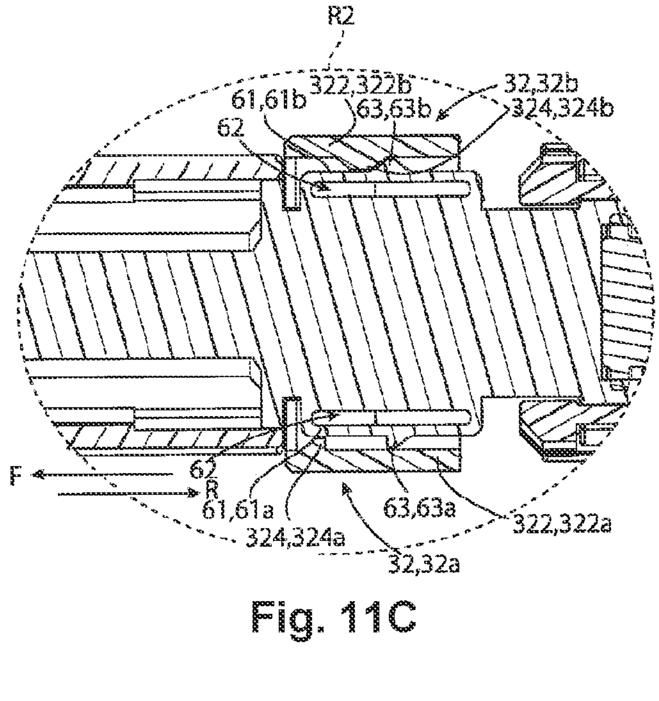
FIG. 11C is a detail view of a portion R2 of FIG. 11C.

FIG. 10A illustrates an isometric view similar to FIGS. 4A, 6A, and 8A in which the CPA has proceeded into a completely mated position and cross sectional views in FIGS. 10B and 10C. Further, FIG. 11B illustrates a partially-enlarged view of a region R1 shown in FIG. 10B and FIG. 11C illustrates a partially-enlarged view of a region R2 shown in FIG. 10C.

At the stage shown in FIGS. 8A-9C where the connector 10 and the mating connector 50 are in the completely mated state and the CPA 30 stays in the unmated position, the CPA 30 is pressed forward as indicated by the arrow F.

In the state shown in FIGS. 8A-9C, the beam portion 33 remains pressed down by the separating portion 55. That is, the beam portion 33 is free from contact with the lock portion 26. Accordingly, at this stage, only the interference between the second device-side catch portion 324*b* and the second housing-side catch portion 63*b* makes it difficult for the CPA 30 to slide forward (in the direction of the arrow F). Accordingly, pressing the handling portion 34 of the CPA 30 forward (in the direction of the arrow R) with such a strength as to overcome the interference between the second device-side catch portion 324*b* and the second housing-side catch portion 63*b* causes the CPA 30 to slide into the completely mated position shown in FIGS. 10A-11C, with a sense of clicking effected by the interference.

In this way, it is not until the connector 10 and the mating connector 50 are brought into the completely mated state that the CPA 30 can slide into the completely mated position. Once the CPA 30 slides into this completely mated position, the protrusion 332 of the beam portion 33 fits into a portion of the long hole 27 of the lock arm 24 that is in front of the lock portion 26, so that the protrusion 332 comes into contact with the lock portion 26, as shown in FIG. 11B. Further, once the CPA 30 slides into the completely mated position, the second device-side catch portion 324*b* becomes located in front of the second housing-side catch portion 63*b* and interferes with the second housing-side catch portion 63*b*, as shown in FIG. 11C. That is, a pair of the second device-side catch portion 324*b* and the second housing-side catch portion 63*b* plays a role as a full lock that holds the CPA 30 in the completely mated position. In this way, this contact and this interference inhibit an unintended slide of the CPA 30 from the completely mated position.

Further, when the CPA 30 is in the completely mated position, a lower surface 251 of the handling portion 25 of the lock arm 24 comes into contact with an upper surface 311 of the basal portion 31 of the CPA 30, whereby the handling portion 25 of the lock arm 24 is inhibited from being pressed down. That is, when the CPA 30 is in a state of having slid into the completely mated position, unintended disengagement of the lock portion 26 from the lock hole 54 is inhibited, so that the connector 10 and the mating connector 50 are kept locked in the completely mated state.

That is, it is assured by the CPA 30 being in the completely mated position that the connector 10 and the mating connector 50 are in a completely mated state.

It should be noted that the mating of the connector 10 and the mating connector 50 and a slide of the CPA 30 have been separately described here. Note, however, that in the case of the present embodiment, it is also possible to mate the connectors 10 and 50 with each other simply by pressing the handling portion 34 of the CPA 30 from a stage preceding the complete mating. In that case, pressing the handling portion 34 of the CPA 30 causes the mating to proceed, and the CPA 30 slides into the completely mated position immediately after the complete mating.

When the connector 10 and the mating 50 are brought out of the completely mated state into detachment, the CPA 30 is slid into the unmated position by pulling the handling portion 34 of the CPA 30 rearward (in the direction of the arrow R). Next, the lock portion 26 is unlocked from the lock hole 54 by pressing down the handling portion 25 of the lock arm 24 of the housing 20 of the connector 10, for example, with a finger. This unlocking makes it possible to detach the connector 10 and the mating connector 50 from each other.

The connector 10 of the present invention stops a connector made larger in size by including a seal member from becoming even larger in size due to the inclusion of the CPA 30. According to the present invention above, a connector 10 including a CPA 30 with a reduced height of a housing is achieved.

Although a waterproof connector mounted with a CPA has been described here, a connector of the present invention is not necessarily limited to a waterproof type. The present invention is widely applicable to a connector having a housing that is made even larger in size by formation of a sliding surface.

What is claimed is:

1. A connector, comprising:

a housing having a mating portion matable with a mating connector and a flexible beam with a housing-side catch portion; and a connection position assurance device that slides between a first position on the housing and a second position closer to the mating portion than the first position and that, by being in the second position, assures that the connector is in a state of being completely mated with the mating connector, the flexible beam extends in a sliding direction of the connector position assurance device and slidably supports the connector position assurance device, the housing-side catch portion interferes with the connector position assurance device and deflects by interfering with the connector position assurance device, the connector position assurance device includes a rail that has a device-side catch portion interfering with the housing-side catch portion and that slides while being supported by the flexible beam.

2. The connector of claim 1, wherein the flexible beam is one of a pair of flexible beams provided on both sides of the housing in a width direction intersecting the sliding direction.

3. The connector of claim 2, wherein the rail is one of a pair of rails provided on both sides of the connection position assurance device in the width direction.

4. The connector of claim 1, wherein the housing-side catch portion is a first housing-side catch portion provided on a first side of the housing and the device-side catch portion is a first device-side catch portion provided on a first side of the connector position assurance device.

5. The connector of claim 4, wherein the first housing-side catch portion catches the first device-side catch portion when the connector position assurance device is in the first position.

6. The connector of claim 5, wherein the housing has a second housing-side catch portion provided on a second side of the housing opposite the first side in a width direction intersecting the sliding direction.

7. The connector of claim 6, wherein the connection position assurance device has a second device-side catch portion on a second side of the connector position assurance device opposite the first side in the width direction.

8. The connector of claim 7, wherein the second housing-side catch portion catches the second device-side catch portion when the connector position assurance device is in the second position.

9. The connector of claim 1, further comprising a waterproof seal member.

10. A connector, comprising:

a housing having a mating portion and a flexible beam with a housing-side catch portion; and a connection position assurance device that slides in a sliding direction between a first position on the housing and a second position closer to the mating portion than the first position, the flexible beam extends in the sliding direction, the connector position assurance device includes a rail that has a device-side catch portion interfering with the housing-side catch portion and that slides while being supported by the flexible beam.

11. The connector of claim 10, wherein the housing-side catch portion is a first housing-side catch portion, the housing has a second housing-side catch portion on an opposite side of the housing from the first housing-side catch portion.

12. The connector of claim 11, wherein the device-side catch portion is a first device-side catch portion, the connection position assurance has a second device-side catch portion on an opposite side of the connection position assurance from the first device-side catch portion.

13. The connector of claim 12, wherein the first housing-side catch portion catches the first device-side catch portion in the first position and the second housing-side catch portion catches the second device-side catch portion in the second position.

14. The connector of claim 10, wherein the connector has a seal member disposed inside the housing.

15. The connector of claim 14, wherein the seal member surrounds a cable and forms a waterproof seal between the housing and the cable.

16. The connector of claim 10, wherein the housing has a lock arm with a front end fixed and a rear end opposite the front end in the sliding direction in a shape of a cantilever beam.

17. The connector of claim 16, wherein the connection position assurance device has a basal portion with the rail and a beam portion extending from the basal portion.

18. The connector of claim 17, wherein the beam portion contacts the lock arm in the first position and prevents movement of the connection position assurance device in the sliding direction.

19. The connector of claim 17, wherein the beam portion engages the lock arm in the second position.

* * * * *